United States Patent
Heuel et al.

(10) Patent No.: US 8,765,227 B2
(45) Date of Patent: Jul. 1, 2014

(54) MOUNTING DEVICE FOR MOUNTING A BODYSHELL SLIDING DOOR OF A MOTOR VEHICLE

(75) Inventors: Gerhard Heuel, Olpe (DE); Michael Krehmke, Plettenberg (DE); Ralf Rottmann, Drolshagen (DE)

(73) Assignee: Dura Automotive Body & Glass Systems GmbH (DE)

( * ) Notice: Subject to any disclaimer, the term of this patent is extended or adjusted under 35 U.S.C. 154(b) by 698 days.

(21) Appl. No.: 12/960,995

(22) Filed: Dec. 6, 2010

(65) Prior Publication Data
US 2011/0135826 A1 Jun. 9, 2011

(30) Foreign Application Priority Data

Dec. 7, 2009 (DE) .................. 10 2009 057 301

(51) Int. Cl.
*B05D 3/12* (2006.01)

(52) U.S. Cl.
USPC ............. 427/299; 296/202; 269/37; 269/329; 269/901; 269/905; 254/93 R

(58) Field of Classification Search
USPC .......... 427/421.1, 299; 296/202; 269/37, 329, 269/905, 901; 254/93 R
See application file for complete search history.

(56) References Cited

U.S. PATENT DOCUMENTS

| | | | |
|---|---|---|---|
| 6,199,849 B1 * | 3/2001 | Lebwohl et al. | 269/37 |
| 2006/0068094 A1 * | 3/2006 | Cole | 427/240 |
| 2009/0000200 A1 * | 1/2009 | Heuel et al. | 49/209 |

FOREIGN PATENT DOCUMENTS

| | | |
|---|---|---|
| DE | 10 2008 016 650 B3 | 5/2009 |
| DE | 10 2008 026 137 A1 | 12/2009 |
| EP | 2 008 846 A2 | 12/2008 |

* cited by examiner

*Primary Examiner* — Timothy Meeks
*Assistant Examiner* — Nathan T Leong
(74) *Attorney, Agent, or Firm* — Alleman, Hall & McCoy LLP; John P. Russel; Dean B. Watson

(57) ABSTRACT

An improved mounting device for mounting a bodyshell sliding door to a body-in-white of a motor vehicle during a painting operation comprises a body connection which can be mounted to the body-in-white and a door connection which can be mounted to the bodyshell sliding door. The body connection and the door connection are connected with each other by a multiple joint.

4 Claims, 6 Drawing Sheets

MOUNTING DEVICE FOR MOUNTING A BODYSHELL SLIDING DOOR OF A MOTOR VEHICLE

CROSS REFERENCE TO RELATED APPLICATION

This application claims priority to German Patent Application No. 10 2009 057 301.1, entitled "Mounting Device for Mounting a Bodyshell Sliding Door of a Motor Vehicle", filed Dec. 7, 2009, which is hereby incorporated by reference it its entirety for all purposes.

TECHNICAL FIELD

The present disclosure relates to a mounting device for mounting a bodyshell sliding door to a body-in-white of a motor vehicle during a painting operation and a method for painting a bodyshell sliding door and a body-in-white of a motor vehicle.

BACKGROUND AND SUMMARY

The sliding door, which can be manufactured on the basis of the bodyshell sliding door, preferably comprises a guide rail and a sliding carriage which is longitudinally movably mounted on the guide rail and which is connected with the vehicle body by a multiple joint. Initially, the guide rail and the sliding carriage are not yet attached to the bodyshell sliding door to be painted, but they can be attached to the bodyshell sliding door.

A sliding door which can be manufactured with such bodyshell sliding door is known from DE 10 2008 016 650 B3, to which reference is made here expressly. In this sliding door, the multiple joint can comprise a hinge stirrup which is rotatably mounted on the sliding carriage and on a body flange, and a control lever which is rotatably mounted on the sliding carriage and on a or the body flange. The prior art sliding door furthermore comprises a first intermediate lever which is rotatably mounted on the control lever, and a second intermediate lever which is rotatably mounted on the first intermediate lever and on the sliding carriage. At the end facing away from the hinge stirrup, the sliding door is rotatably and longitudinally movably mounted. It can be locked there. The control lever includes an extension on which the first intermediate lever is rotatably mounted. At the connecting joint of the first intermediate lever and of the second intermediate lever a guide pin is provided, which is guided in a guideway provided at the sliding door. The guideway extends inclined relative to the guide rail. The guideway extends inclined outwards in a direction away from the hinge stirrup.

Another sliding door, which can be manufactured from a bodyshell sliding door of the present disclosure, is described in EP 2 008 846 A2, to which reference likewise is made here expressly. Here, a drive rod is present, which is rotatably mounted on the control lever. At the end facing away from the hinge stirrup, the sliding door is rotatably and longitudinally movably mounted. It can be locked there. The drive rod is rotatably mounted on the guide rail. The control lever includes a lever arm on which the drive rod is rotatably mounted. At an intermediate lever, which is rotatably mounted on the sliding carriage, a guide pin is provided, which is guided in a guideway provided at the sliding door.

From the non-prepublished prior German Patent Application 10 2008 026 137.8, to which reference likewise is made here expressly, another sliding door is known, which can be manufactured from a bodyshell sliding door of the invention. Here, the control lever includes a lever arm on which a guide pin is provided, which is guided in a guideway provided at the sliding door. The guideway preferably extends inclined outwards in a direction away from the hinge stirrup.

The paintwork of a bodyshell sliding door of a motor vehicle and of a body-in-white of a motor vehicle takes place in several steps. In general, the body-in-white including the doors and lids passes through one or more immersion baths, for example a cleaning stage, a degreasing zone and/or a phosphating zone. In these immersion baths the body-in-white is rotated, so that it is required to fix the doors and lids to the body-in-white, in order to prevent them from moving uncontrolled. After the immersion baths, the body-in-white can pass through a washing installation. Thereafter, wet painting takes place, which can comprise the steps of priming, top coating and/or clear coating. During wet painting it is required to be able to open and close the doors and lids, so as to for example also paint the door apertures. After wet painting, the body-in-white passes through a drying stage in which it can be heated for example to 180° C. or some other temperature.

In certain method steps of the painting operation it thus is desirable or required that the bodyshell door takes a closed position or a position slightly ajar with respect to the closed position, in which the bodyshell door is fixed. The closed position is that position in which the bodyshell door fills the associated opening in the body-in-white, namely preferably in the same way as the finished door also fills the opening of the finished body.

In other method steps of the painting operation, however, it is desirable or required that the bodyshell door is removed from the associated door opening of the body-in-white.

A usual bodyshell swing door of a motor vehicle can temporarily be mounted for the painting operation. The hinge for the pivotability of the swing door is already present at the bodyshell swing door and at the body-in-white, so that it can be utilized for the painting operation.

In a bodyshell sliding door for a motor vehicle this is, however, not the case. Here, the guide rail, the sliding carriage and the multiple joint can be mounted on the bodyshell sliding door only after the painting operation, since these parts would be damaged during the painting operation. In particular, the surface of the guide rail should not be contaminated with parts of the paint. The joints of the multiple joint generally are sensitive to heat and should therefore not pass through the drying stage.

It is the object of the present disclosure to provide for an improved painting operation of a bodyshell sliding door and an associated body-in-white of a motor vehicle and to propose an improved method for painting a bodyshell sliding door and an associated body-in-white of a motor vehicle.

In accordance with the present disclosure, this object is solved by a mounting device for mounting a bodyshell sliding door to a body-in-white of a motor vehicle. The mounting device comprises a body connection which is mountable to the body-in-white, and a door connection which is mountable to the bodyshell sliding door. The body connection and the door connection are connected with each other by a multiple joint.

In a method for painting a bodyshell sliding door and an associated body-in-white of a motor vehicle the object underlying the present disclosure is solved in that a body connection is mounted to the body-in-white and that a door connection, which is connected with the body connection by a multiple joint, is mounted to the bodyshell sliding door, wherein the sequence of these steps can be chosen as desired.

It can be advantageous when first the door connection is mounted to the bodyshell sliding door and thereafter the body connection is mounted to the body-in-white.

It can, however, also be advantageous when first the body connection is mounted to the body-in-white and thereafter the door connection is mounted to the bodyshell sliding door.

An embodiment of the present disclosure will be explained in detail below with reference to the attached drawings.

DETAILED DESCRIPTION

Figure 1:
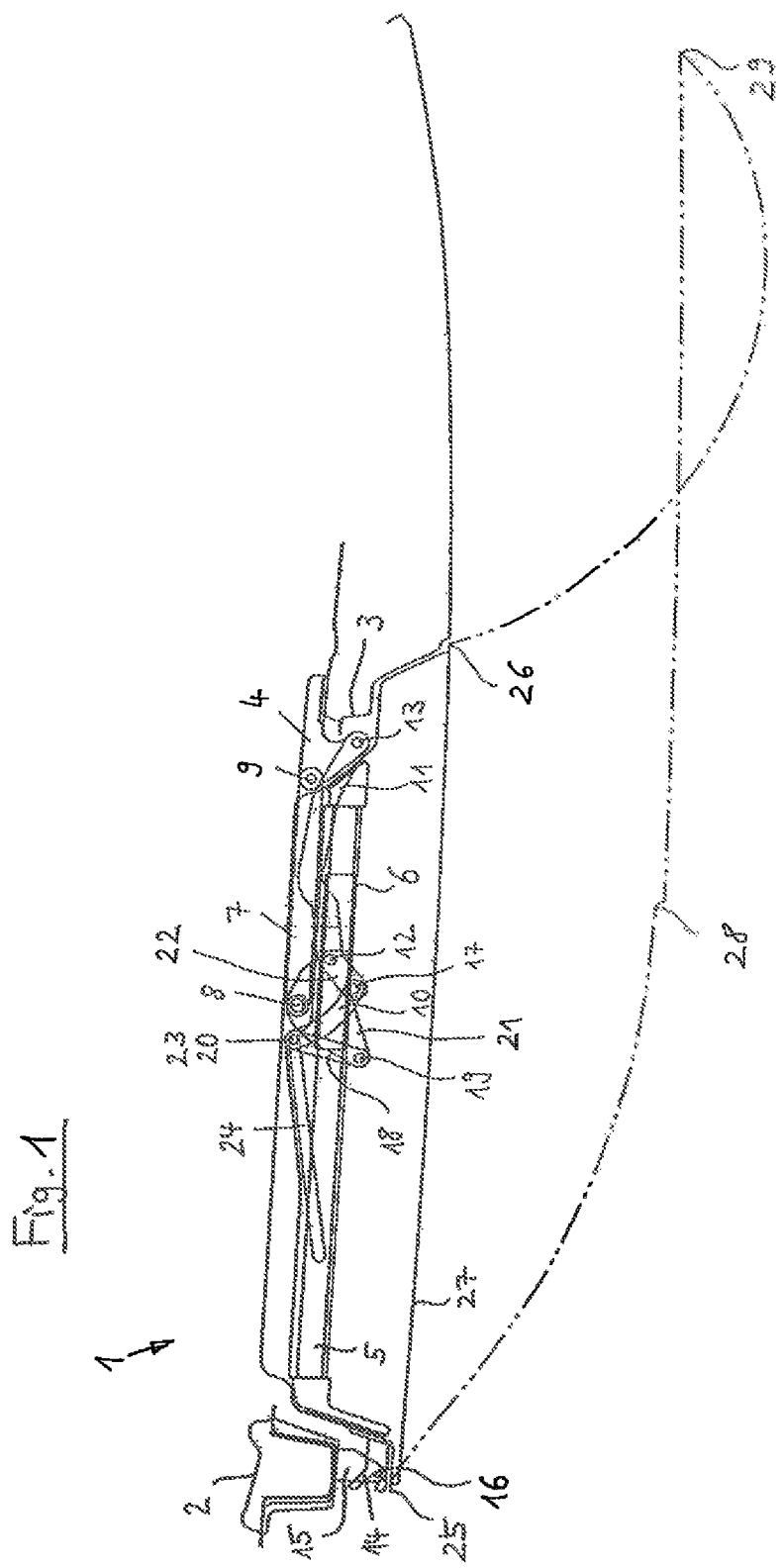
FIG. 1 shows a prior art sliding door for a motor vehicle in the closed position in a schematic view from above.
Figure 2:
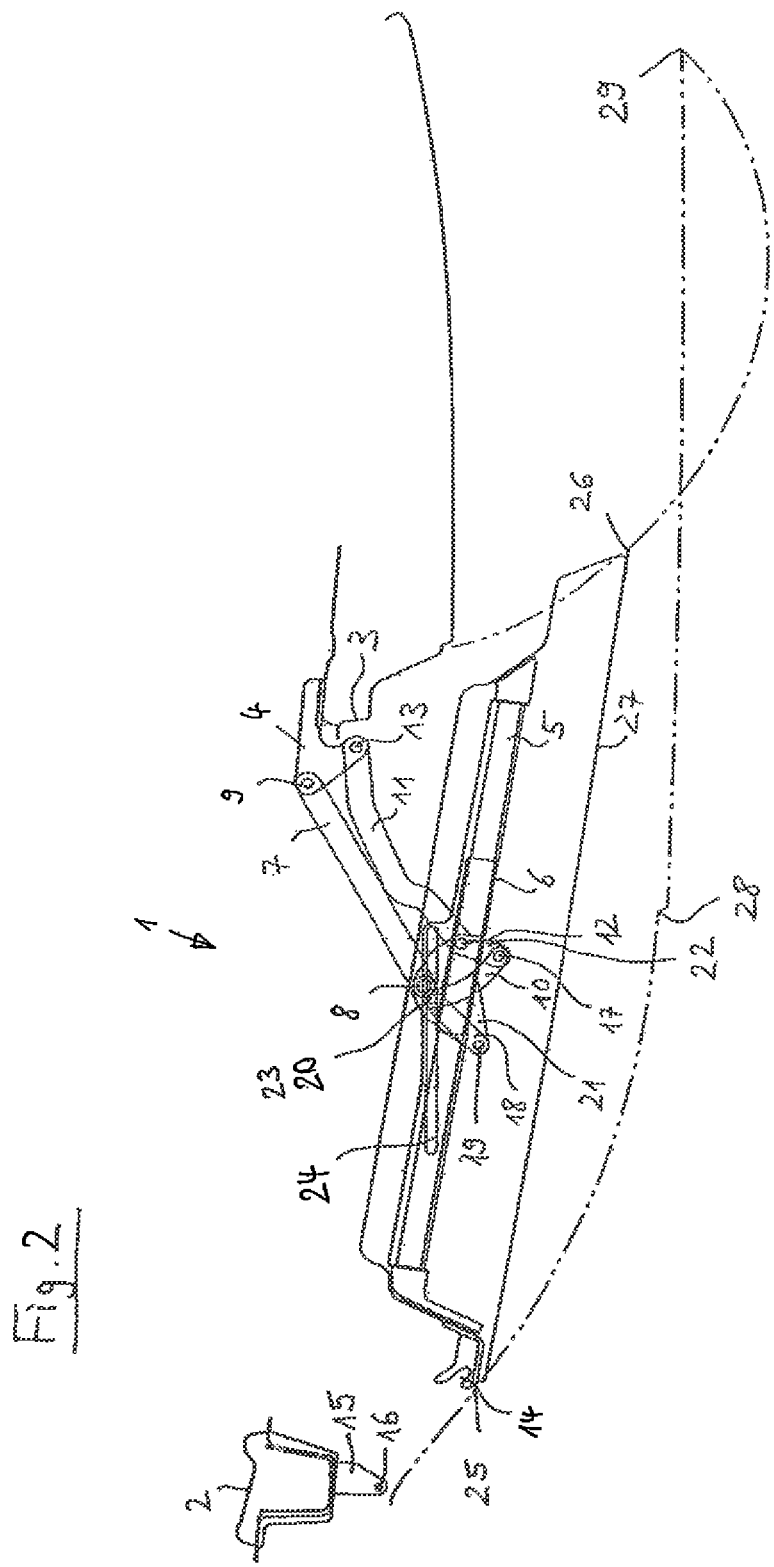
FIG. 2 shows the sliding door of FIG. 1 in a partly open position in a schematic view from above corresponding to FIG. 1.
Figure 3:
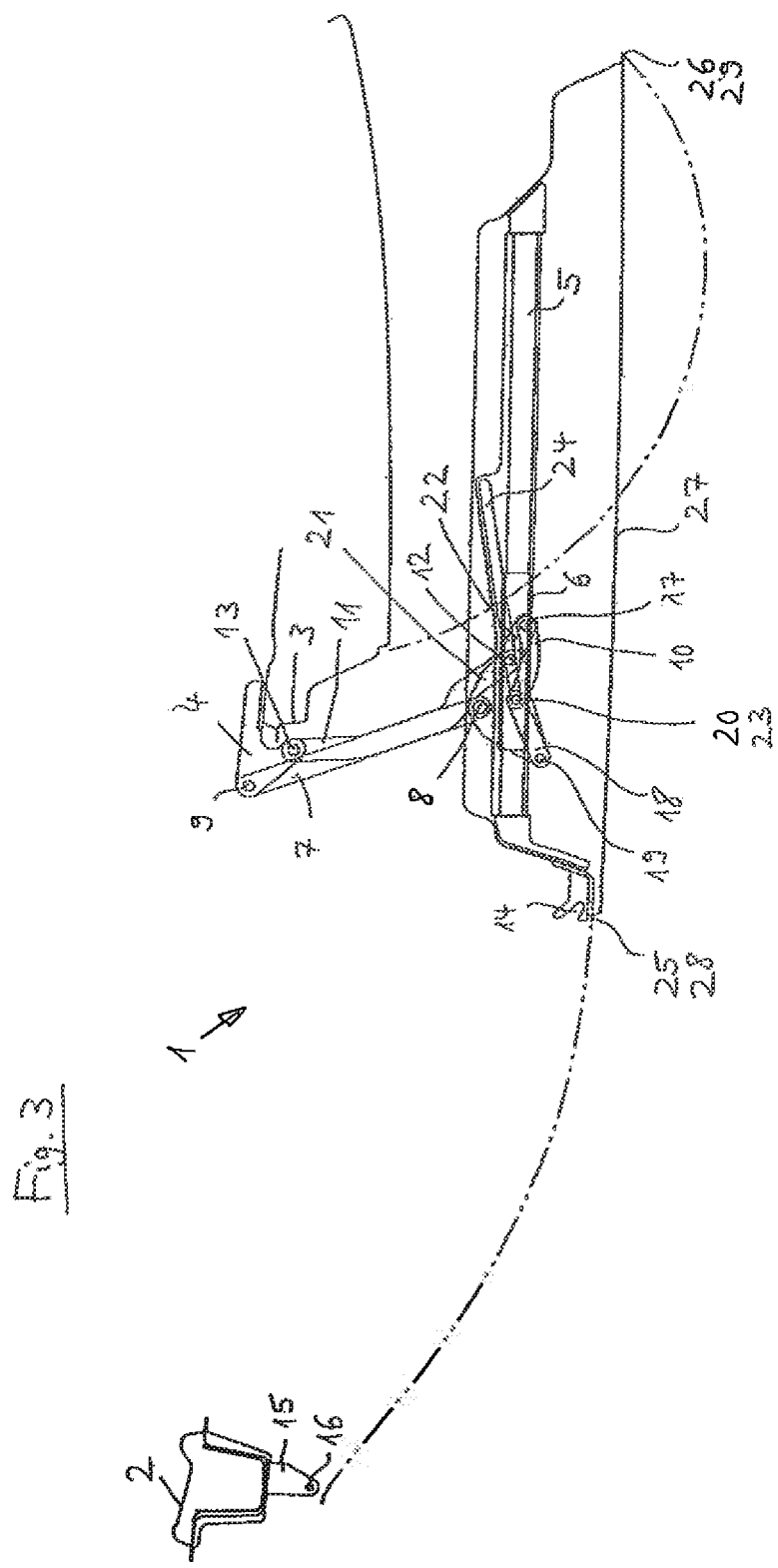
FIG. 3 shows the sliding door of FIGS. 1 and 2 in the completely open position in a schematic view from above corresponding to FIGS. 1 and 2.

FIGS. 1, 2 and 3 show the sliding door 1 according to an embodiment of DE 10 2008 016 650 B3. The sliding door 1 is the left rear door of a motor vehicle. It is located in the opening of the body between the B-pillar 2 and a rear body part 3 in whose region a body flange 4 is connected with the body. The rear body part 3 can be the C-pillar or the A-pillar.

On its inside, the sliding door 1 includes a guide rail 5. On the guide rail 5, a sliding carriage 6 is mounted in a longitudinally movable manner.

The sliding door 1 furthermore includes a hinge stirrup 7 and a control lever 11. The hinge stirrup 7 is rotatably mounted on the sliding carriage 6 about a joint 8 and on the body flange 4 about a joint 9. The control lever 11 is rotatably mounted on the sliding carriage 6 about a joint 12 and on the body flange 4 about a joint 13.

On the control lever 11 a first intermediate lever 10 is rotatably mounted, namely about the axis of a joint 17. On the sliding carriage 6 a second intermediate lever 18 is rotatably mounted, namely about the axis of a joint 19. The joint 19 is located in the outer region of the sliding carriage 6. It is located in the region of the front end of the sliding carriage 6. The ends of the intermediate levers 10, 18 facing away from the joints 17, 19 are rotatably connected with each other by a joint 20. The first intermediate lever 10 and the second intermediate lever 18 form a toggle lever. Since the connecting joint 20 of the intermediate levers 10, 18 is located further to the inside than the joints 17, 19 with respect to the motor vehicle, the toggle lever formed by the intermediate levers 10, 18 points to the inside with respect to the motor vehicle.

To the sliding carriage 6 a joint plate 21 is attached, which carries the joints 8, 12 and 19. The hinge stirrup 7, the control lever 11, the sliding carriage 6 as well as the hinge plate 21 and the body flange 4 form a multiple joint with the joints 8, 9, 12 and 13.

At the end of the sliding door 1 opposite the hinge stirrup 7 a U-shaped receptacle 14 is provided at the sliding door 1, which extends inclined with respect to the longitudinal direction of the vehicle, namely in vehicle direction forwards to the inside. It is open at its end facing away from the hinge stirrup 7, i.e. at its front inner end in this embodiment. On a body flange 15, which is attached to the B-pillar 2, a hinge bolt 16 is provided, which engages in the U-shaped receptacle 14. In the completely closed position of the sliding door as shown in FIG. 1, the hinge bolt 16 is located at the bottom of the U-shaped receptacle 14. It can be locked there (not shown in the drawing).

The control lever 11 includes an extension 22 which extends outwards from the joint 12. The extension 22 extends the control lever 11 along the connecting line from the joint 13 to the joint 12 beyond the joint 12. The extension 22 is slightly bent to the outside and to the rear, respectively, with respect to the connecting line between the joints 13 and 12, i.e. the longitudinal direction of the control lever 11. At the control lever 11, the joint 17 for the first intermediate lever 10 is provided in the region of the outer end of the extension 22.

At the connecting joint 20 of the first intermediate lever 10 and of the second intermediate lever 18, a guide pin 23 is provided, which is guided in a guideway 24. The guideway 24 is provided at the sliding door 1. Correspondingly, the guideway 24 is a guideway firmly mounted in the door. It extends with an inclination relative to the guide rail 5 in a direction away from the hinge stirrup 7 to the outside. The guideway 24 is configured continuously linearly. Its inclination is the same along its entire length.

In the completely closed position of the sliding door 1, which is shown in FIG. 1, the hinge bolt 16 lies in the U-shaped receptacle 14, namely in the region of its end. The guide pin 23 is located in the region of the rear, inner end of the guideway 24. The first intermediate lever 10 points forwards and to the inside from the joint 17. The second intermediate lever 18 points rearwards and to the inside from the joint 19.

In the course of the opening movement, the position as shown in FIG. 2 is passed through. This opening movement can be generated in that the guide rail 5 is moved to the rear relative to the sliding carriage 6. On the sliding carriage 6 a motor, in particular an electric motor, can be provided for driving the guide rail 5 relative to the sliding carriage 6. Instead or in addition a motor, in particular an electric motor, can be provided for driving the hinge stirrup 7 and/or the control lever 11. Advantageously, a motor for driving the hinge stirrup 7 and/or the control lever 11 is provided on the body flange 4 or some other body part.

The opening movement can, however, also be generated by hand instead or in addition. In particular, the guide rail 5 can manually be moved to the rear relative to the sliding carriage 6. For this purpose, a handle or several handles can be provided at the sliding door 1, by means of which the sliding door 1 and with the same the guide rail 5 can be moved relative to the sliding carriage 6. The handle can be provided at the inner front end of the sliding door 1 and/or at the outer front end of the sliding door 1 and/or at the outer rear end of the sliding door 1. The sliding door 1 can be opened and also be closed again by applying force at each of these three points.

Without the guide pin 23, the sliding carriage 6 might freely be shifted on the guide rail 5. The guide pin 23 guided in the guideway 24 prevents this free shiftability and defines the relative position of the sliding carriage 6 with respect to the guide rail 5 and hence with respect to the sliding door 1. This is effected in the portions of the guideway 24 which have an inclination different from zero with respect to the guide rail 5, i.e. do not extend parallel to the guide rail 5. The guideway 24 has the same inclination different from zero with respect to the guide rail 5 along its entire length.

When the guide rail 5 is moved to the rear relative to the sliding carriage 6 by motor and/or by hand, the guide pin 23 guided in the guideway 24 moves to the outside relative to the guide rail 5 and to the sliding carriage 6, whereby the second intermediate lever 18 is swivelled in clockwise direction about the joint 19. By moving the guide pin 23 relative to the sliding carriage 6 to the rear and to the outside, the joint 17 located at the other end of the first intermediate lever 10 likewise is moved to the rear, whereby the control lever 11 is rotated about the joint 12 in anti-clockwise direction. The control lever 11 thereby is swivelled in anti-clockwise direction about the joint 13 at the body flange 4. By swivelling the control lever 11, the hinge stirrup 7 is also swivelled in anti-clockwise direction about the joint 9. The joint plate 21 of the sliding carriage 6 likewise is forcibly guided by swivelling the hinge stirrup 7 about the joint 9, since it forms a multiple joint with the hinge stirrup 7, the control lever 11 and the body flange 4—as explained above.

The drive movement for opening the sliding door 1 can, however, also be initiated in some other way, in particular by a motorized and/or manual drive of the hinge stirrup 7 and/or the control lever 11 and/or the first intermediate lever 10 and/or the second intermediate lever 18 about one or more of the joints 9, 8, 13, 12, 17, 20, 19.

The completely open position of the sliding door 1 is shown in FIG. 3. The first intermediate lever 10 has been swivelled in clockwise direction about the joint 17 with respect to the extension 22 by about 90°. The guide pin 23 has reached the front, closed end of the guideway 24. The second intermediate lever 18 has been swivelled in clockwise direction about the joint 19 with respect to the sliding carriage 6 or the joint plate 21 by about 45°. The opening angle of the intermediate levers 10, 18 at the joint 20 has been increased from about 30° to about 150°. The control lever 11 and the hinge stirrup 7 have been swivelled by an angle of 120° in anti-clockwise direction about the joints 13 and 9.

When the sliding door 1 is to be closed, the described positions are passed through in reverse order. The closing movement of the sliding door 1 can be effected in that the guide rail 5 is moved forwards by motor and/or by hand relative to the sliding carriage 6. The relative movement of the guide rail 5 is transmitted by the guideway 24 to the guide pin 23 and from there introduced into the described multiple joint via the first intermediate lever 10. It is also possible, however, to initiate the closing movement in a way as it has been described for the opening movement.

Figure 4:
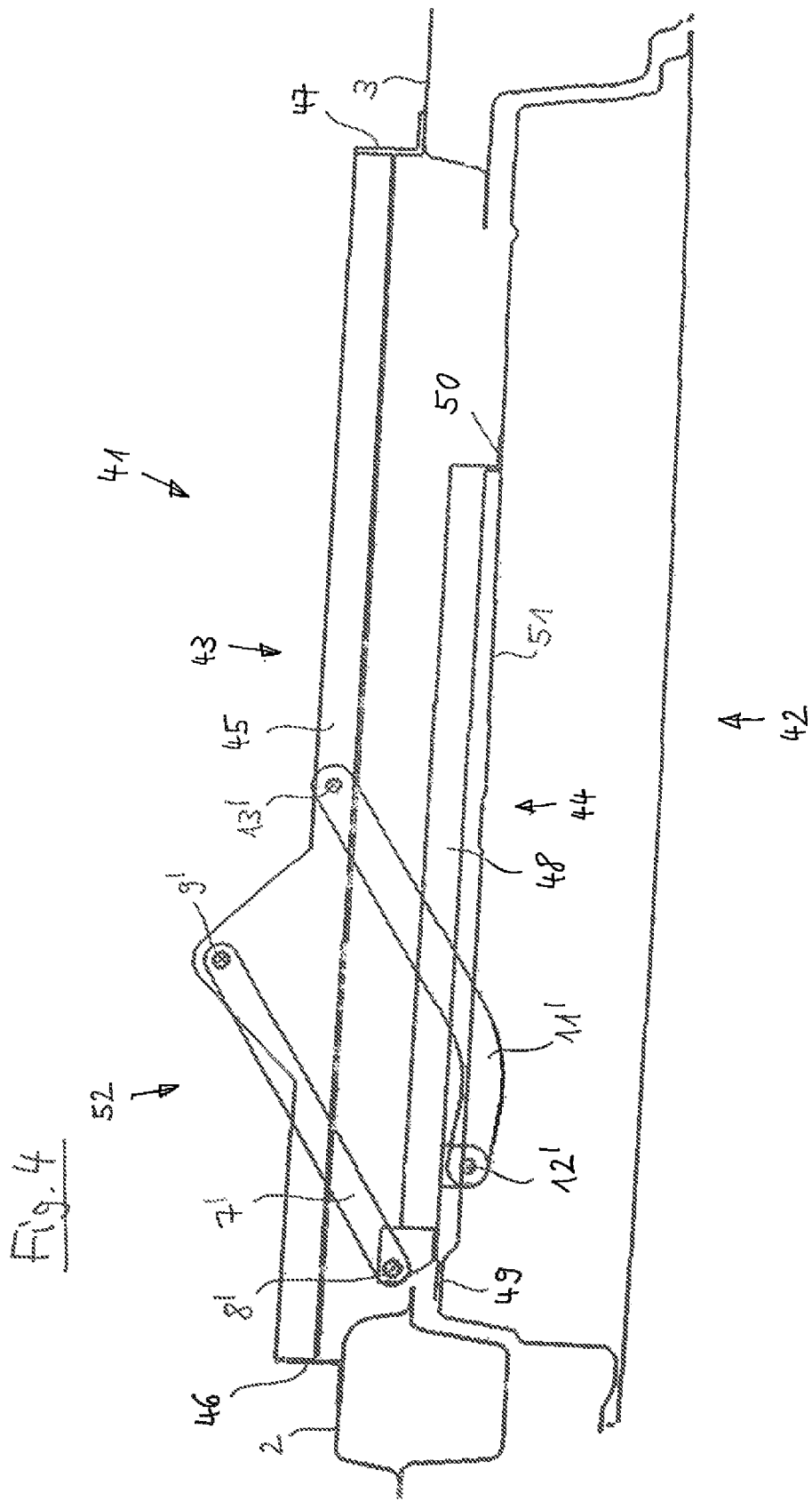
FIG. 4 shows a bodyshell sliding door, from which the sliding door of FIGS. 1 to 3 can be manufactured, in the closed position in a schematic view from above, together with an embodiment of the mounting device in accordance with the present disclosure.

In FIGS. 1, 2 and 3, the paths of the front end 25 and of the rear end 26 of the outer door panel 27 are illustrated. The front end 25 of the outer door panel 27 initially moves at an angle of about 30° with respect to the longitudinal axis of the vehicle to the rear and to the outside. The angle of inclination of the U-shaped receptacle 14 corresponds to this angle. Subsequently, it describes an arc with a large radius, whose end 28 includes a tangent extending parallel to the longitudinal axis of the vehicle. The rear end 26 of the outer door panel 27 initially moves approximately at right angles away from the body and then describes a narrowing arc up to an end point 29 which substantially has the same distance from the body of the vehicle as the end point 28 of the front end 25. The mounting device 41 as shown in FIG. 4 for mounting a bodyshell sliding door 42 to a body-in-white of the motor vehicle during a painting operation comprises a body connection 43 and a door connection 44. A body-in-white refers to a plurality of un-painted sheet metal components of a car body that have been welded together, but without moving parts (doors, hoods, and deck lids as well as fenders), the motor, chassis sub-assemblies, or trim (glass, seats, upholstery, electronics, etc.).

The body connection 43 comprises a mounting frame 45 which is mounted to the B-pillar 2 and to the C-pillar 3 of the body-in-white. For this purpose, the mounting frame 45 is provided with mounting brackets 46, 47 at its front and rear ends. One leg of the mounting brackets 46, 47 each rests against the B-pillar 2 and against the C-pillar 3. There, the respective leg is releasably connected with the B-pillar 2 and the C-pillar 3. In particular, the mounting brackets 46, 47 are screwed to the B-pillar 2 and to the C-pillar 3.

The door connection 44 comprises a mounting frame 48 which is mounted to the bodyshell sliding door 42. For this purpose, the mounting frame 48 includes mounting brackets 49, 50 at its ends, one leg of which each is releasably connected with the inner panel 51 of the bodyshell sliding door 42. In particular, the legs of the mounting brackets 49, 50 are screwed to the inner panel 51.

The body connection 43 and the door connection 44 are connected with each other by a multiple joint 52. Similar to the multiple joint of the finished sliding door 1, the multiple joint 52 comprises a hinge stirrup 7' which at the mounting frame 45 is pivotally mounted about a joint 9' and at the mounting frame 48 about a joint 8', and a control lever 11' which at the mounting frame 45 is pivotally mounted about a joint 13' and at the mounting frame 48 about a joint 12'. The joint 13' is located substantially in the middle of the mounting frame 45 and in transverse direction of the vehicle within the connecting line of the B-pillar 2 with the C-pillar 3. The joint 9' is located before the joint 13' in longitudinal direction of the vehicle and inside the joint 13' in transverse direction of the vehicle. The joint 8' is located behind the B-pillar 2 and before the joints 13' and 9' in longitudinal direction of the vehicle. It is located outside the joint 13' in transverse direction of the vehicle. The joint 12' is located behind the joint 8' and before the joint 9' in longitudinal direction of the vehicle. It is located outside the joint 8' in transverse direction of the vehicle.

FIG. 4 shows the mounting device in the closed position.

Figure 5:
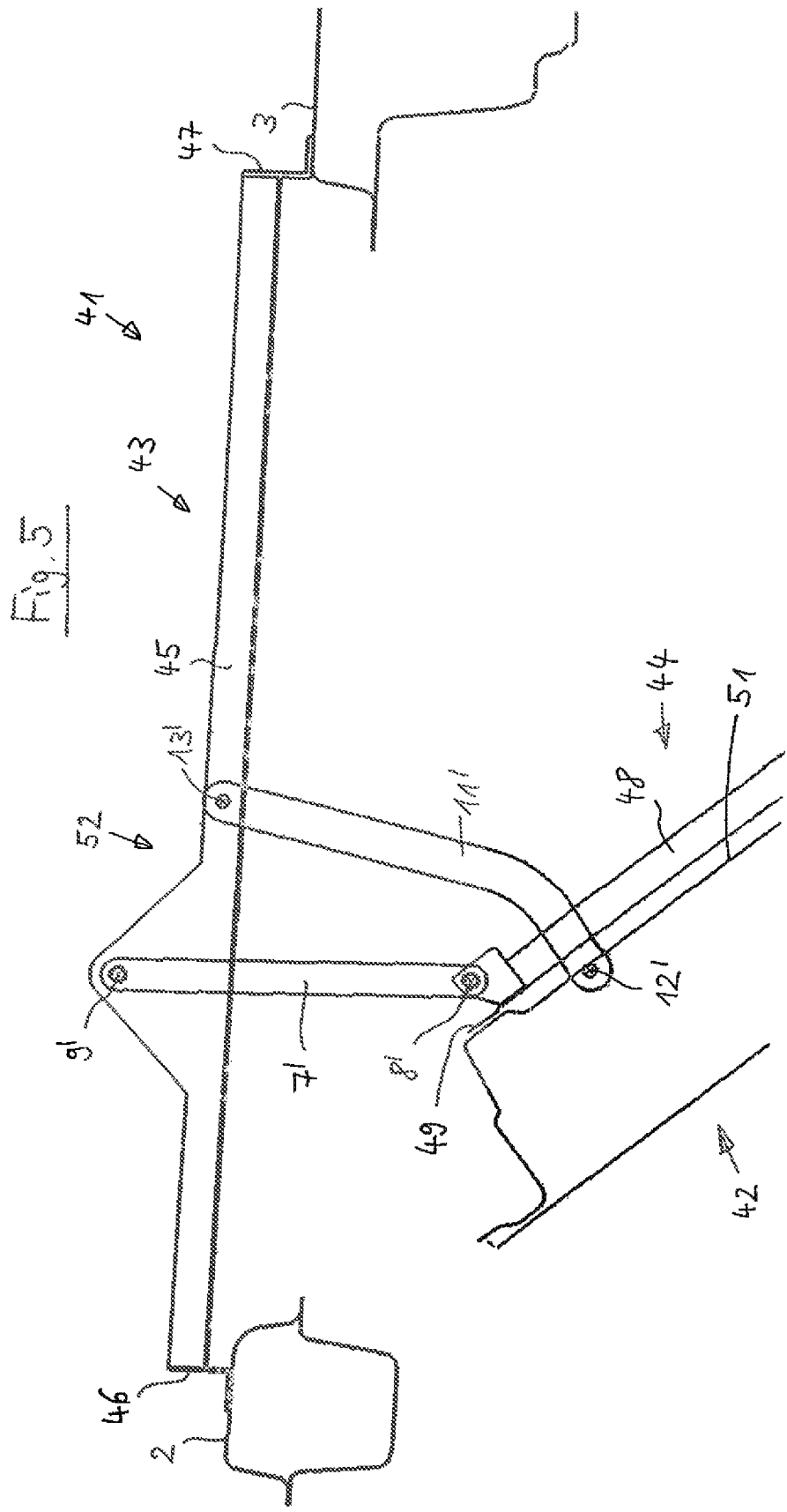
FIG. 5 shows the bodyshell sliding door and the mounting device of FIG. 4 in the open position in a schematic view from above.
Figure 6:
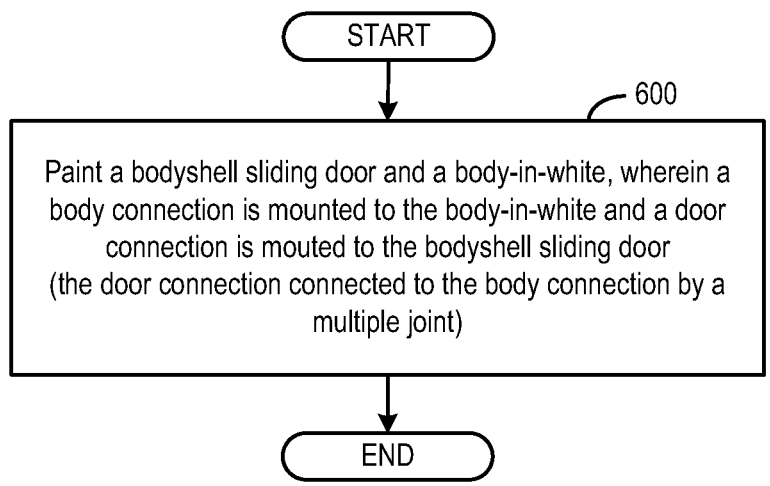
FIG. 6 shows a method of painting a bodyshell sliding door and an associated body-in-white of a motor vehicle such as shown in FIGS. 4-5.

By swivelling the multiple joint 52, the bodyshell sliding door 42 can be swivelled with respect to the body-in-white. FIG. 5 shows the completely open position of the bodyshell sliding door 42. The hinge stirrup 7' has been swivelled about the joint 9' and the control lever 11' has been swivelled about the joint 13', each in anti-clockwise direction.

In the closed position as shown in FIG. 4, the bodyshell sliding door 42 fills the associated aperture in the body-in-white. The bodyshell sliding door 42 is fixed in this position. Fixing can be effected by releasable clamps and/or by locking the multiple joint 52. In this closed position as shown in FIG. 4, the immersion baths can be passed through.

In the open position as shown in FIG. 5, the steps of wet painting can be performed. It is possible to more or less open or close the bodyshell sliding door 42 during these method steps, which can also be effected several times depending on the requirement and which can be performed by industrial robots.

The assembly of the mounting device 41 can be effected in the following steps: First of all, the body connection 43 and the door connection 44 are connected with each other by the multiple joint 52. Subsequently, the door connection 44 is mounted to the bodyshell sliding door 42. The unit mounted in this way, comprising the mounting device 41 and the bodyshell sliding door 42, finally is positioned at the body-inwhite, i.e. at the B-pillar 2 and the C-pillar 3, and the body connection 43 is mounted to the body-in-white, i.e. to the B-pillar 2 and the C-pillar 3.

After performing the painting operation, the mounting device 41 can be demounted again. This is preferably effected in reverse order. It is, however, advantageous not to release the connection of the body connection 43 and the door connection 44 by the multiple joint 52, but merely demount the door connection 44 from the bodyshell sliding door 42 and demount the body connection 43 from the body-in-white, i.e. from the B-pillar 2 and from the C-pillar 3. The mounting device 41, comprising the body connection 43 and the door connection 44 connected by the multiple joint 52, can then be used for the next painting operation of the next bodyshell sliding door and of the next body-in-white.

From the bodyshell sliding door 42 a sliding door 1 or some other type of sliding door can be manufactured after the paintwork.

The invention claimed is:

1. A method, comprising:
    painting a bodyshell sliding door and an associated body-in-white of a motor vehicle, wherein a mounting frame of a body connection of a mounting device is mounted to a B-pillar of the body-in-white at a front end of the mounting frame and to a C-pillar of the body-in-white at a rear end of the mounting frame, and wherein a door connection of the mounting device, which is connected with the body connection by a multiple joint, is mounted to the bodyshell sliding door.

2. The method according to claim 1, wherein first the door connection is mounted to the bodyshell sliding door and thereafter the body connection is mounted to the body-in-white.

3. The method according to claim 1, wherein first the body connection is mounted to the body-in-white and thereafter the door connection is mounted to the bodyshell sliding door.

4. A method, comprising:
    painting a bodyshell sliding door and an associated body-in-white of a motor vehicle, wherein a mounting frame of a body connection of a mounting device is mounted to a B-pillar of the body-in-white at a front end of the mounting frame and to a C-pillar of the body-in-white at a rear end of the mounting frame, and wherein a door connection of the mounting device, which is connected with the body connection by a multiple joint, is mounted to the bodyshell sliding door such that the bodyshell sliding door is coupled to the associated body-in-white, including opening and closing the coupled bodyshell sliding door during the painting; and then
    demounting the mounting device by demounting the door connection from the bodyshell sliding door and by demounting the body connection from the body-in-white, and re-using the mounting device on a subsequent bodyshell sliding door.

* * * * *